US011512451B2

(12) United States Patent
Jones et al.

(10) Patent No.: US 11,512,451 B2
(45) Date of Patent: Nov. 29, 2022

(54) WORK VEHICLE, OBJECT INDICATION SYSTEM, AND METHOD OF INDICATING LOCATION OF AN OBJECT

(71) Applicant: DEERE & COMPANY, Moline, IL (US)

(72) Inventors: Amy K. Jones, Asbury, IA (US); Keith J. Lensing, Asbury, IA (US); Michael G. Kean, Maquoketa, IA (US); Nathaniel M. Czarnecki, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 183 days.

(21) Appl. No.: 16/892,260

(22) Filed: Jun. 3, 2020

(65) Prior Publication Data

US 2021/0381202 A1 Dec. 9, 2021

(51) Int. Cl.
*E02F 9/26* (2006.01)
*B60Q 9/00* (2006.01)
(Continued)

(52) U.S. Cl.
CPC ............... *E02F 9/261* (2013.01); *B60Q 9/00* (2013.01); *E02F 9/0858* (2013.01); *E02F 3/34* (2013.01);
(Continued)

(58) Field of Classification Search
CPC .......... G08G 1/166; G08G 1/005; G08G 1/01; G08G 1/07; G08G 1/095; G08G 1/096716; G08G 1/09675; G08G 1/096783; G08G 1/167; B60Q 9/00; B60Q 1/305; B60Q 1/30; B60Q 1/326; B60Q 1/38; B60Q 1/503; B60C 23/0408; B60C 23/009; B60C 23/0433; B60D 1/62; B60D 1/06; B60D 1/065; B60P 1/00; B60W 2050/0063; B60W 2420/40; B60W 2510/18; B60W 2540/215; B60W 30/18027; B60W 50/082; B60W 50/085; B60W 10/04; B60W 10/06; B60W 10/18; B60W 2050/021; B60W 2556/50; B60W 2710/105; B60W 2720/10; B60W 30/1819; B60W 50/038; B62D 53/068; B62D 55/065; B62D 55/08; B62D 55/30; F16H 2059/525; F16H 2061/023; F16H 37/046; F16H 61/0213; F16H 61/0248; G01M 17/013; Y10S 477/90;
(Continued)

(56) References Cited

U.S. PATENT DOCUMENTS 5,845,272 A * 12/1998 Morjaria ............. G06F 11/2257
706/50
5,934,409 A * 8/1999 Citron ................... B66F 11/044
182/17

(Continued)

*Primary Examiner* — Daniel Previl

(57) ABSTRACT

A method of indicating to an operator of a work vehicle a relative location of an object, an object indication system, and a work vehicle are provided. The method includes sensing the object with one or more sensors positioned at one or more sensor positions on the work vehicle and activating one or more indicators positioned at one or more indicator positions relative to the operator based on the sensing of the object with the one or more sensors. Each sensor position directionally corresponds to one or more of the indicator positions.

18 Claims, 3 Drawing Sheets

(51) Int. Cl.
*E02F 9/08* (2006.01)
*G01S 15/931* (2020.01)
*G01S 7/56* (2006.01)
*E02F 3/34* (2006.01)

(52) U.S. Cl.
CPC ............... *G01S 7/56* (2013.01); *G01S 15/931* (2013.01); *G01S 2015/937* (2013.01)

(58) Field of Classification Search
CPC . Y10T 477/644; Y10T 477/65; Y10T 477/81; B60R 2325/205; B60R 2325/304; B60R 25/102; B60R 25/2009; B60R 25/33; B60T 17/22; B60Y 2200/145; E02F 3/34; E02F 3/6454; E02F 3/651; E02F 3/652; E02F 3/657; E02F 9/0858; E02F 9/261; F01L 1/00; F01L 2710/006; F02B 77/08; G01C 9/34; G01S 15/931; G01S 2013/9315; G01S 2013/93271; G01S 2013/93272; G01S 2013/93274; G01S 2015/937; G01S 7/56

USPC .......... 340/435, 426.33, 433, 432, 444, 463, 340/464, 483, 488, 524, 539.11, 539.22, 340/539.26

See application file for complete search history.

(56) References Cited

U.S. PATENT DOCUMENTS

| | | | | |
|---|---|---|---|---|
| 6,133,851 | A * | 10/2000 | Johnson | B60Q 1/545 340/901 |
| 6,894,608 | B1 * | 5/2005 | Gunderson | G01S 15/931 340/471 |
| 7,388,480 | B1 * | 6/2008 | Jackson | B60Q 1/305 340/463 |
| 9,424,749 | B1 * | 8/2016 | Reed | G08G 1/01 |
| 2005/0062590 | A1 * | 3/2005 | Lang | B60D 1/62 340/431 |
| 2011/0210867 | A1 * | 9/2011 | Benedikt | G08G 1/01 340/905 |
| 2016/0137059 | A1 * | 5/2016 | Mäder | G08B 21/06 340/575 |
| 2019/0299946 | A1 * | 10/2019 | Miller, Jr. | B60T 8/38 |
| 2020/0290507 | A1 * | 9/2020 | Cobb | B60Q 1/52 |

* cited by examiner

WORK VEHICLE, OBJECT INDICATION SYSTEM, AND METHOD OF INDICATING LOCATION OF AN OBJECT

BACKGROUND

Work vehicles operate in work areas to accomplish such tasks as earth moving, agricultural tasks, hauling, and other tasks with occasional or frequent movement of the work vehicle to new locations in or outside of the work area. The work vehicle may have one or more work tool that is operated in the work area to accomplish tasks. Multiple work vehicles, other equipment, personnel, and/or mobile and/or fixed objects may operate and/or be positioned together in the work area. Personnel and operators of work vehicles and other equipment maintain awareness of the work vehicles, equipment, and other personnel and objects within the work area. In a non-limiting example, an operator of a construction work vehicle may be positioned in the operator station of the work vehicle and visually check the surroundings of the work vehicle before or while controlling movement or another operation of the work vehicle and/or operating a work tool of the work vehicle to accomplish one or more tasks in the work area.

SUMMARY

Various aspects of examples of the present disclosure are set out in the claims.

In accordance with an aspect of the present disclosure, a method of indicating to an operator of a work vehicle a relative location of an object spaced a distance from the work vehicle is provided. The method includes sensing the object with one or more of a plurality of sensors positioned at a plurality of sensor positions on the work vehicle and activating one or more of a plurality of indicators positioned at a plurality of indicator positions relative to the operator based on the sensing of the object with the one or more of the plurality of sensors, each of the plurality of sensor positions directionally corresponding to one or more of the plurality of indicator positions.

In accordance with another aspect of the present disclosure, an object indication system to indicate to an operator of a work vehicle the relative location of an object spaced a distance from the work vehicle is provided. The system includes a plurality of sensors configured to be positioned at a plurality of sensor positions on the work vehicle and configured for sensing the object and a plurality of indicators configured to be positioned at a plurality of indicator positions that directionally correspond to the plurality of sensor positions and configured to activate based on the sensing of the object.

In accordance with another aspect of the present disclosure, a work vehicle configured to be controlled by an operator in a work area is provided. The work vehicle includes an operator station configured to position the operator, a plurality of sensors distributed at a plurality of sensor positions relative to the operator, oriented away from the operator, and configured to sense an object, and a plurality of indicators distributed at a plurality of indicator positions at the operator station corresponding to the plurality of sensor positions for indication to the operator of a relative location of the object.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
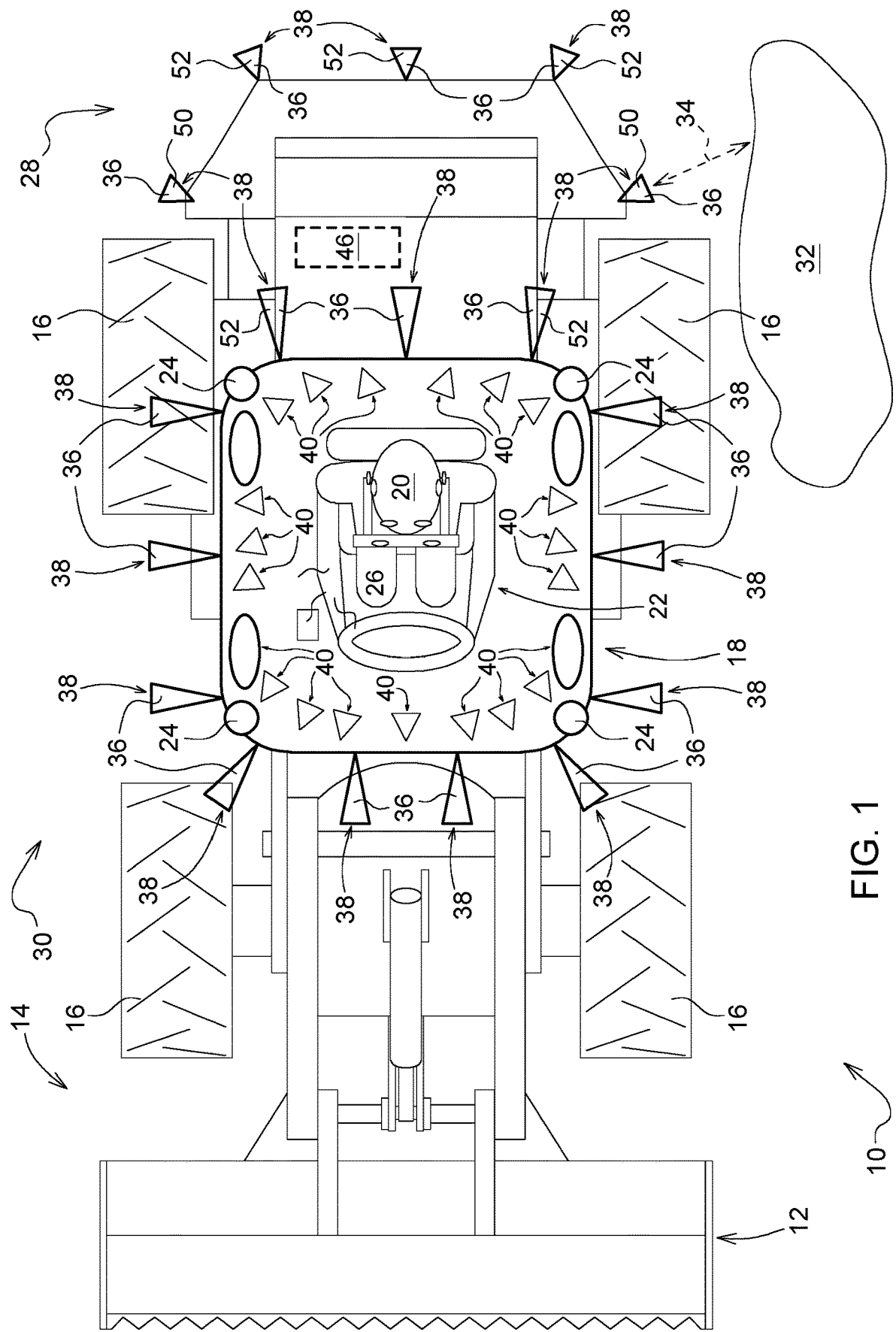
FIG. 1 illustrates a top schematic view of a work vehicle and an object indication system in accordance with an embodiment of the present disclosure.
Figure 2:
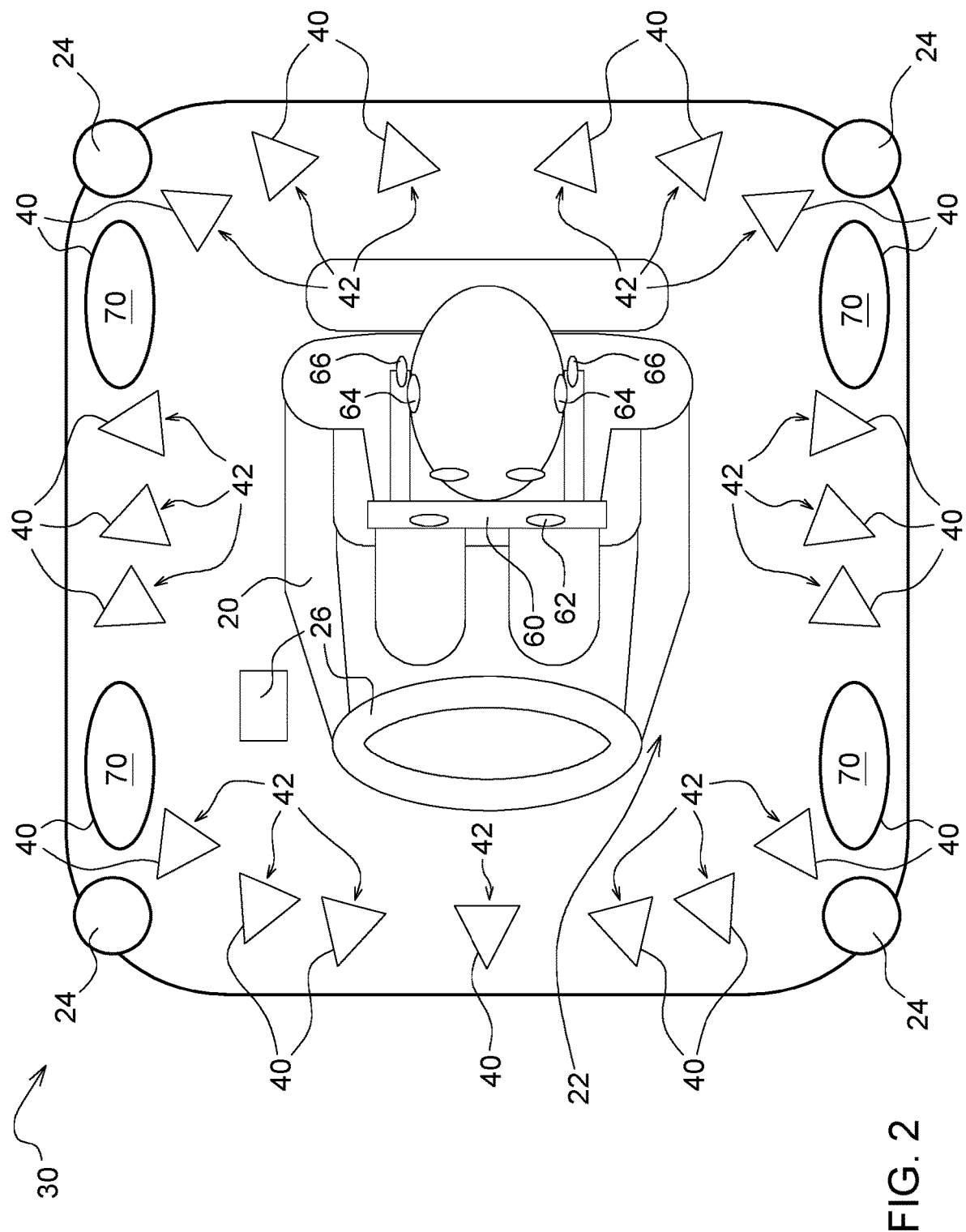
FIG. 2 illustrates a top schematic view of an operator station of a work vehicle in accordance with an embodiment of the present disclosure.
Figure 3:
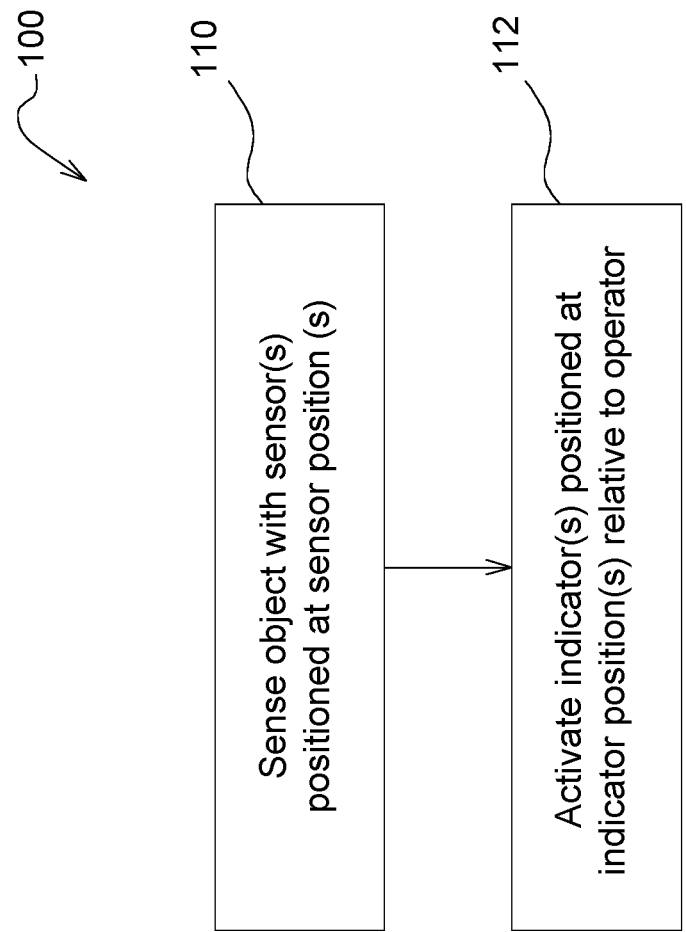
FIG. 3 illustrates a method of indicating to an operator of a work vehicle a relative location of an object.

At least one embodiment of the subject matter of this disclosure is understood by referring to FIGS. 1 through 3 of the drawings.

Referring now to FIG. 1, a work vehicle 10 is illustrated in accordance with an embodiment of the present disclosure. The work vehicle 10 of the illustrated embodiment is a front loader construction vehicle, but the work vehicle 10 in additional embodiments includes any other vehicle configured for use in the construction industry, agricultural industry, or forestry industry or any other vehicle configured for on or off-road use. The work vehicle 10 of the illustrated embodiment includes a work tool 12. Although the work vehicle 10 of FIG. 1 illustrates a bucket as the work tool 12, the work tool 12 of one or more embodiments includes any one or more construction, agricultural, or other attachments, implements, or work tools couple to or configured to operate at a front end 14 of the work vehicle 10, a rear end 28 of the work vehicle 10, or at any other location relative to the work vehicle 10. The work vehicle 10 of the illustrated embodiment includes four wheels 16 configured to move the work vehicle 10 relative to a ground surface, but any number or combination of wheels, tracks, and/or other ground-engaging members may be included in additional embodiments of the present disclosure. The work vehicle 10 of the illustrated embodiment further includes an operator station 18 configured to contain, locate, or otherwise position an operator 20 to enable the operator 20 to operate the work vehicle 10. The operator 20 of the illustrated embodiment controls the work vehicle 10, the work tool 12, and/or any other aspect of the work vehicle 10 from an operator position 22 in or at the operator station 18 using one or more work vehicle control(s) 26 including, without limitation, a steering wheel, a joystick, and/or another interface or engagement device. In the illustrated embodiment, the operator station 18 includes pillars 24 supporting one or more portions of the operator station 18.

An object indication system 30 is included in one or more embodiments of the present disclosure. The system 30 is configured to indicate to the operator 20 of the work vehicle 10 the relative location of an object 32 spaced a distance 34 from the work vehicle 10. In an embodiment, the relative location of the object 32 refers to a location of the object 32 relative to the work vehicle 10. In additional embodiments of the present disclosure, the relative location of the object 32 refers to a location of the object 32 relative to one or more sensor(s), other object, individual, base station, or other location.

The system 30 of the embodiment illustrated in FIG. 1 includes a plurality of sensors 36 positioned or configured to be positioned at a plurality of sensor positions 38 on the work vehicle 10. The sensors 36 sense or are configured to sense the object 32. The sensors 36 of the illustrated embodiment include ultrasonic sensors, but the sensors 36 include one or more of infrared, laser or radar based, or any other object-sensing devices or systems in additional embodiments of the present disclosure. The sensor positions 38 for the sensors 36 of the illustrated embodiment are located on or at the operator station 18 and/or the rear end 28 as illustrated in FIG. 1, but the sensor positions 38 of other embodiments may be located elsewhere, including on or at the front end 14, the work tool 12, and/or any other portion of the work vehicle 10. As illustrated in FIG. 1, the sensors 36 are distributed at sensor positions 38 relative to a location of the operator 20, The sensors 36 are oriented away from the operator station 18, the operator 20, and/or the work vehicle 10 and are configured to sense the object 32. The object 32 of one or more embodiments includes any one or multiple stationary or movable objects, obstacles, boundaries, or other physical anomalies to the area surrounding the work vehicle 10. In a non-limiting example, the object 32 includes another vehicle approaching the work vehicle 10 that the work vehicle 10 and/or the system 30 may sense and indicate to the operator 20 in order for the operator 20 to control the work vehicle 10 away from the object 32. In additional embodiments not illustrated, there are multiple objects 32 located at different locations relative to the work vehicle 10 that the work vehicle 10 and/or the system 30 simultaneously and/or separately senses and indicates to the operator 20. As described in the embodiments herein, the term "object" included in any embodiment refers to any one or multiple objects sensed by the work vehicle 10 or the system 30.

The work vehicle 10 and/or the system 30 of one or more embodiments includes a controller 46. The controller 46 receives or is configured to receive one or more sensor signals from the sensors 36 in an embodiment. The controller 46 and/or the sensors 36 associate(s) each signal sent by each sensor 36 with the sensor position 38 of that sensor 36. In an embodiment, the sensor signal includes a signal distance value representing the distance 34 between the sensor 36 and the object 32. Accordingly, in at least one embodiment, the controller 46 receives or otherwise determines a signal location value, which is based on the sensor position 38 of the signal-sending sensor 36, and the signal distance value, which is based on the distance 34 between the sensor 36 and the object 32 sensed by the signal-sending sensor 36. As illustrated in FIG. 1, a primary signal-sending sensor 50 senses the distance 34 between it and the object 32 and sends its signal distance value to the controller 46. In additional embodiments, secondary sensors 52 located adjacent to or near the primary sensor 50 may also sense the object 32 and provide separate distance values that will be associated with their respective sensor positions 38. The controller 46 receives or otherwise determines the signal location value with the signal distance value received from the primary and secondary sensors 50, 52.

As shown in FIGS. 1 and 2, the system 30 of certain illustrated embodiments further includes a plurality of indicators 40 positioned or being configured to be positioned at a plurality of indicator positions 42 directionally corresponding to the sensor positions 38. The indicators 40 of embodiments of the present disclosure provide visual indication, audible indication, and/or haptic or physical indication, such as via vibrational or movement feedback to the work vehicle control(s) 26 in a non-limiting example. The indicators 40 activate or are configured to activate based on the sensing of the object 32. In the embodiments shown, the indicators 40 are distributed at the indicator positions 42 in, on, or otherwise at the operator station 18. The indicator positions 42 in an embodiment correspond to the sensor positions 38 for indication to the operator 20 of the relative location of the object 32. In other words, each of the indicator positions 42 is aligned with, is positioned adjacent to, and/or corresponds with one or more of the sensor positions 38, such as relative to a line of sight or directional angle from the position or location of the operator 20, such that the operator 20 associates an indication from an indicator 40 as relating to the aligned, adjacent, or otherwise corresponding or associated sensor 36. Accordingly, the operator 20 may receive indication of the location and/or the distance 34 of the object 32, such as from the work vehicle 10.

In an embodiment of the present disclosure, each of the plurality of sensors 36 is configured to sense the distance 34 of the object from the corresponding sensor position 38 of the plurality of sensor positions 38. Each of the plurality of indicators 40 is configured for activation based on the distance 34 of the object 32 from the corresponding sensor position 38.

In an embodiment of the present disclosure, a different quantity of indicators 40 is activated based on the distance 34 of the object 32 that is sensed from the corresponding sensor position 38. In a non-limiting example, a larger quantity of indicators 40 is activated when one of the sensors 36 senses that the object 32 moves or is otherwise located closer to the sensor 36. In a particular embodiment, a first quantity of the plurality of indicators 40 is configured for activation based on a first distance of the object 32 from the corresponding sensor position. In a non-limiting example, three adjacent indicators 40 are activated based on the object 32 being located within ten meters of the sensor 36 having the sensor position 38 corresponding to the location of the indicator 40 at the center of the three adjacent indicators 40. A second quantity of the plurality of indicators 40 is configured for activation based on a second distance of the object 32 from the corresponding sensor position. In the non-limiting example, five adjacent indicators 40, or two additional indicators 40 on each end, are activated based on the object 32 being located within five meters of the sensor 36 having the sensor position 38 corresponding to the location of the indicator 40 at the center of the five adjacent indicators 40. In a similar embodiment, as the location of the object 32 changes relative to each sensor position 38, other sensors 36 or groups of sensors 36 may be activated and/or deactivated to indicate relative position and/or distance of the object 32 from the work vehicle 10. An illustrative embodiment of the indicators 40 may include a series of lights aligned, in a non-limiting example, on a rope light or similar configuration. The various embodiments of the indicators 40 described herein may be implemented on a rope light or via similar configuration or via another configuration of visual or audible indicators 40, mounted on, in, or at the operator station 18, such as adjacent to and/or around the operator 20, on one or more of the pillar(s) 24, at or adjacent to one or more base(s) of a window in the operator station 18, and/or at or adjacent to an edge of the roof of the operator station 18, to name non-limiting examples.

In various embodiments of the present disclosure, an output of each of the plurality of indicators 40 is varied or configured to be varied based on the distance 34 of the object 32 from the corresponding sensor position 38. In certain embodiments, the plurality of indicators 40 visually indicates or is configured to visually indicate based on the sensing of the presence or location of the object 32. In a non-limiting example, one or more of the indicators 40 are lamps that individually illuminate to visually indicate the presence or location of the object 32. In another non-limiting example, the output as an intensity of light from each lamp is modulated or varied based on the distance 34 of the object 32 from the corresponding sensor position 38.

In certain embodiments, the plurality of indicators 40 audibly indicates or is configured to audibly indicate based on the sensing of the presence or location of the object 32. In a non-limiting example, one or more of the indicators 40 are transducers or speakers that individually actuate to produce impulses, vibration, or sound waves to audibly indicate the presence or location of the object 32. In another non-limiting example, the output as a volume of sound or actuation intensity from each transducer or speaker is modulated or varied based on the distance 34 of the object 32 from the corresponding sensor position 38.

As illustrated in FIG. 3, in an embodiment of the present disclosure, the system 30 includes an interfacing member 60 coupled to or configured to couple to the operator 20 of the work vehicle 10. The interfacing member 60 includes one or more of the indicators 40, as described in one or more of the embodiments herein, that are positioned or configured to be positioned in, on, or at the interfacing member 60 for indication to the operator 20 of the work vehicle 10 the location of the object 32 relative to the operator 20. In the illustrated embodiment, the interfacing member 60 includes eyewear 62, earphones 64, a jawbone-interacting device 66, headwear, another device, and/or any combination thereof mounted on, to, or at the operator 20, or adjacent to the operator 20, to contain, mount, support or otherwise provide one or more of the indicators 40 for visual or audible indication in accordance with any embodiments described herein. Further, in the illustrated embodiment, the interfacing member 60 may include augmented reality and/or interactive features or functions to provide engagement with the operator 20 and/or one or more audible or visual indication. In a non-limiting example, a right side lens and a left side lens of the interfacing member 60 may include one or more lights or other visual indicators that are activated and/or modulated based on a presence and/or location of the object 32 on the right or left side of the operator 20 and/or work vehicle 10. Similarly, in another non-limiting example, a right side earphone and a left side earphone of the interfacing member 60 may include one or more speakers 70, transducers, or other audible indicators that are each activated and/or modulated based on a presence and/or location of the object 32 on the right or left side of the operator 20 and/or work vehicle 10. Any indicators 40 or indicating functions described in the various embodiments of the present disclosure may be utilized interchangeably and/or in combination with other indicators 40 or indicating functions, such as the indicators 40 being mounted in or on the operator station 18 as well as in or on the interfacing member 60 in a non-limiting example.

The system 30 and/or the work vehicle 10 of a further embodiment includes a dynamic adapter that modulates or varies or is configured to modulate or vary the indications by the indicators 40 and/or other operations of the system 30 and/or the work vehicle 10 based on previous or historical input from observation of, sensing of, or other input from the behavior of the operator 20 following previous indication events. The system 30 and/or the work vehicle 10 includes one or more operator sensor(s), instrument and/or controls input device(s), data storage device(s), and/or controller(s) in embodiments of the present disclosure to receive input of behavior of or other data relating to the operator 20 and send output to a separate controller or the indicator(s) 40 based on the input. In a non-limiting example to illustrate, the output from the dynamic adapter increases the output of one or more of the indicators 40 based on an input indicating that the operator 20 is reacting insufficiently to previous indications by one or more indicator(s) 40 as determined by an insufficient or absent change to vehicle controls for the work vehicle 10. Data as input to the dynamic adapter may be stored, processed, and/or utilized by the dynamic adapter and/or another controller in the form of models or utilizing algorithms for operation of the dynamic adapter, the larger system 30, and/or any other operation or system of the work vehicle 10.

Referring now to FIG. 3 of the present disclosure, the present disclosure further provides a method 100 of indicating to the operator 20 of the work vehicle 10 the relative location of the object 32 spaced the distance 34 from the work vehicle 10. The method 100 includes sensing, at step 110, the object 32 with one or more of the sensors 36 positioned at the plurality of sensor positions 38 on the work vehicle 10. The method 100 further includes activating, at step 112, one or more of the indicators 40 positioned at one or more of the indicator positions 42 relative to the operator 20 based on the sensing of the object 32 with the one or more sensors 36. Each of the sensor positions 38 is located adjacent to, is aligned with, directionally corresponds to, or otherwise corresponds to the one or more indicator positions 42, such as to indicate to the operator 20 of the work vehicle 10 the relative location of the object 32.

The method 100 of particular embodiments further includes sensing the object 32 with the one or more sensors 36 by sensing the distance 34 of the object 32 from the one or more sensors 36 and activating the one or more indicators 40 by activating the one or more indicators 40 based on the distance 34 of the object 32. As discussed in further detail above, the method 100 of an embodiment further includes activating a first quantity of the one or more indicators 40 based on a first distance of the object 32 and activating a second quantity of the one or more indicators 40 based on a second distance of the object 32. In an embodiment, the first quantity of the one or more indicators 40 is different from the second quantity of the one or more indicators 40. Also described in further detail above, the method 100 of particular embodiments may further include modulating or varying the output of the one or more indicators 40 based on the distance 34 of the object 32, such as varying an intensity of light for visual indication or varying a volume, frequency, or other characteristic or output of sound or vibration for audible indication. Any detail, feature, or function of the work vehicle 10 or system 30 forms part of one or more embodiments of the method 100 of the present disclosure.

Without in any way limiting the scope, interpretation, or application of the claims appearing below, it will be appreciated that the work vehicle 10, the system 30, and the method 100 of the embodiments of the present disclosure improve the ability of the operator 20 to identify the object(s) 32 and/or determine a location and/or the distance 34 of the object 32. The visual and/or audible indications may reduce or minimize disruption of the tasks, control, and operation by the operator 20 by providing visual and/or audible indications to the operator 20 in the event that the object(s) 32 is/are sensed near the work vehicle 10. Further, the indicators 40 may increase the alertness of the operator 20 regardless of the awareness by the operator 20 of any object(s) 32. Finally, the work vehicle 10, the system 30, and the method 100 improve awareness of the operator 20 of the object(s) 32 when particular conditions or events, such as during excess activity, noise, brightness, darkness, and/or dust/debris, affect the ability of the operator 20 to perceive the area of or around the work vehicle 10.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method of indicating to an operator of a work vehicle a relative location of an object spaced a distance from the work vehicle, the method comprising:
    sensing the object with at least one of a plurality of sensors positioned at a plurality of sensor positions on the work vehicle; and
    activating at least one of a plurality of indicators positioned at a plurality of indicator positions relative to the operator and directing an output of the at least one of the plurality of indicators toward the operator based on the sensing of the object with the at least one of the plurality of sensors, each of the plurality of sensor positions directionally corresponding to at least one of the plurality of indicator positions;
    wherein each of the plurality of indicator positions directionally corresponds to at least one of the plurality of sensor positions on the work vehicle by being configured at a directional angle relative to a position of the operator positioned at an operator station of the work vehicle such that the operator associates an indication from an indicator of the plurality of indicators as relating to a corresponding sensor of the plurality of sensors.

2. The method of claim 1, wherein sensing the object with the at least one of the plurality of sensors comprises sensing the distance of the object from the at least one of the plurality of sensors, and activating the at least one of the plurality of indicators comprises activating the at least one of the plurality of indicators based on the distance of the object.

3. The method of claim 2, further comprising:
    activating a first quantity of the plurality of indicators based on a first distance of the object; and
    activating a second quantity of the plurality of indicators based on a second distance of the object.

4. The method of claim 2, further comprising modulating the output of the at least one of the plurality of indicators based on the distance of the object.

5. The method of claim 1, wherein activating at least one of a plurality of indicators comprises providing a visual indication with the at least one of the plurality of indicators.

6. The method of claim 1, wherein activating at least one of a plurality of indicators comprises providing an audible indication with the at least one of the plurality of indicators.

7. The method of claim 1, wherein a first indicator of the plurality of indicators is positioned at a first side of the operator positioned at the operator station, a second indicator of the plurality of indicators is positioned at a second side of the operator opposite from the first side of the operator positioned at the operator station, a first sensor of the plurality of sensors is positioned at the first side of the operator positioned at the operator station, and a second sensor of the plurality of sensors is positioned at the second side of the operator opposite from the first side of the operator positioned at the operator station such that the first indicator indicates to the operator positioned at the operator station a sensing of the object located at the first side by the first sensor and the second indicator indicates to the operator positioned at the operator station a sensing of the object located at the second side by the second sensor.

8. An object indication system to indicate to an operator of a work vehicle the relative location of an object spaced a distance from the work vehicle, the system comprising:
    a plurality of sensors configured to be positioned at a plurality of sensor positions on the work vehicle and configured for sensing the object; and
    a plurality of indicators having an output, configured to be positioned at a plurality of indicator positions that directionally correspond to the plurality of sensor positions, configured to activate based on the sensing of the object, and oriented to direct the output of the plurality of indicators toward the operator;
    wherein each of the plurality of indicator positions directionally corresponds to at least one of the plurality of sensor positions on the work vehicle by being configured at a directional angle relative to a position of the operator positioned at an operator station of the work vehicle such that the operator associates an indication from an indicator of the plurality of indicators as relating to a corresponding sensor of the plurality of sensors positioned on the work vehicle.

9. The system of claim 8, wherein each of the plurality of sensors is configured to sense the distance of the object from a corresponding sensor position of the plurality of sensor positions, and each of the plurality of indicators is configured for activation based on the distance of the object from the corresponding sensor position.

10. The system of claim 9, wherein a first quantity of the plurality of indicators is configured for activation based on a first distance of the object from the corresponding sensor position, and a second quantity of the plurality of indicators is configured for activation based on a second distance of the object from the corresponding sensor position.

11. The system of claim 9, wherein an output of each of the plurality of indicators is configured to be varied based on the distance of the object from the corresponding sensor position.

12. The system of claim 8, wherein the plurality of indicators is configured to visually indicate based on the sensing of the object.

13. The system of claim 8, wherein the plurality of indicators is configured to audibly indicate based on the sensing of the object.

14. The system of claim 8, further comprising an interfacing member configured to couple to the operator of the work vehicle, the interfacing member comprising the plurality of indicators configured to be positioned at the interfacing member for indication to the operator of the work vehicle the location of the object relative to the operator.

15. The system of claim 8, wherein the relative location of the object is a location of the object relative to the work vehicle.

16. The system of claim 8, wherein a first indicator of the plurality of indicators is positioned at a first side of the operator positioned at the operator station, a second indicator of the plurality of indicators is positioned at a second side of the operator opposite from the first side of the operator positioned at the operator station, a first sensor of the plurality of sensors is positioned at the first side of the operator positioned at the operator station, and a second sensor of the plurality of sensors is positioned at the second side of the operator opposite from the first side of the operator positioned at the operator station such that the first indicator indicates to the operator positioned at the operator station a sensing of the object located at the first side by the first sensor and the second indicator indicates to the operator positioned at the operator station a sensing of the object located at the second side by the second sensor.

17. A work vehicle configured to be controlled by an operator in a work area, the work vehicle comprising:
   an operator station configured to position the operator;
   a plurality of sensors distributed at a plurality of sensor positions relative to the operator, oriented away from the operator, and configured to sense an object; and
   a plurality of indicators each having an output, distributed at a plurality of indicator positions inside the operator station corresponding to the plurality of sensor positions for indication to the operator of a relative location of the object, and each oriented to direct the output toward a location of the operator;
   wherein each of the plurality of indicator positions directionally corresponds to at least one of the plurality of sensor positions on the work vehicle by being configured at a directional angle relative to a position of the operator positioned at the operator station of the work vehicle such that the operator associates an indication from an indicator of the plurality of indicators as relating to a corresponding sensor of the plurality of sensors positioned on the work vehicle.

18. The work vehicle of claim 17, wherein a first indicator of the plurality of indicators is positioned at a first side of the operator positioned at the operator station, a second indicator of the plurality of indicators is positioned at a second side of the operator opposite from the first side of the operator positioned at the operator station, a first sensor of the plurality of sensors is positioned at the first side of the operator positioned at the operator station, and a second sensor of the plurality of sensors is positioned at the second side of the operator opposite from the first side of the operator positioned at the operator station such that the first indicator indicates to the operator positioned at the operator station a sensing of the object located at the first side by the first sensor and the second indicator indicates to the operator positioned at the operator station a sensing of the object located at the second side by the second sensor.

* * * * *